(12) United States Patent
Liu

(10) Patent No.: US 11,860,689 B2
(45) Date of Patent: Jan. 2, 2024

(54) TIME SYNCHRONIZATION METHOD, SERVICE BOARD, AND NETWORK DEVICE

(71) Applicant: Huawei Technologies Co., Ltd., Shenzhen (CN)

(72) Inventor: Fei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 17/537,145

(22) Filed: Nov. 29, 2021

(65) Prior Publication Data

US 2022/0083095 A1 Mar. 17, 2022

Related U.S. Application Data

(63) Continuation of application No. PCT/CN2020/092757, filed on May 28, 2020.

(30) Foreign Application Priority Data

May 31, 2019 (CN) .......................... 201910471781.5

(51) Int. Cl.
  *G06F 1/12* (2006.01)
  *G06F 1/14* (2006.01)
(52) U.S. Cl.
  CPC . *G06F 1/14* (2013.01); *G06F 1/12* (2013.01)
(58) Field of Classification Search
  CPC .................................... G06F 1/14; G06F 1/12
  See application file for complete search history.

(56) References Cited

U.S. PATENT DOCUMENTS

| 4,746,920 A | 5/1988 | Nellen et al. |
| 5,812,757 A * | 9/1998 | Okamoto ............ G06F 11/1658 |
| | | 714/E11.069 |

(Continued)

FOREIGN PATENT DOCUMENTS

| CN | 102263629 A | 11/2011 |
| CN | 103378916 A | 10/2013 |

(Continued)

OTHER PUBLICATIONS

"IEEE Standard for a Precision Clock Synchronization Protocol for Networked Measurement and Control Systems, IEEE Instrumentation and Measurement Society," Technical Committee on Sensor Technology (TC-9), IEEE Std 1588-2008 (Revision of IEEE Std 1588-2002), IEEE 1588 V2, Total 289 pages, Institute of Electrical and Electronics Engineers, New York, New York (Jul. 24, 2008).

(Continued)

*Primary Examiner* — Phil K Nguyen
(74) *Attorney, Agent, or Firm* — Leydig, Voit & Mayer, Ltd.

(57) ABSTRACT

In a time synchronization method, after clock board times between service boards are synchronized, a service board obtains a CPU time and the clock board time of the service board according to a preset periodicity, and makes a record. When performing CPU time synchronization between the service boards, the service board obtains a current CPU time of the service board, calculates a synchronization time of the CPU based on the current CPU time, a last recorded CPU time and clock board time, and adjusts the CPU time of the service board to the synchronization time. After the clock board times between the service boards that need to implement CPU high-precision time synchronization are synchronized by using a high-precision time synchronization pro- (Continued)

tocol, the CPU time of each service board is adjusted to a corresponding synchronization time.

20 Claims, 4 Drawing Sheets

(56) References Cited

U.S. PATENT DOCUMENTS

| | | | | |
|---|---|---|---|---|
| 6,687,851 | B1* | 2/2004 | Somers | G06F 11/1641 |
| | | | | 714/13 |
| 9,451,218 | B2* | 9/2016 | Hanabusa | H04N 21/242 |
| 2006/0041700 | A1* | 2/2006 | Atago | G06F 13/362 |
| | | | | 710/107 |
| 2008/0082293 | A1* | 4/2008 | Hochmuth | H04L 67/75 |
| | | | | 702/108 |
| 2011/0271318 | A1* | 11/2011 | Dakss | H04N 21/426 |
| | | | | 725/139 |
| 2012/0051374 | A1 | 3/2012 | Obradovic et al. | |
| 2013/0262911 | A1 | 10/2013 | Boerger et al. | |
| 2015/0135000 | A1* | 5/2015 | Kimura | H04J 3/0638 |
| | | | | 713/503 |
| 2017/0201606 | A1* | 7/2017 | Ding | G06F 1/14 |

FOREIGN PATENT DOCUMENTS

| | | |
|---|---|---|
| CN | 103713544 A | 4/2014 |
| CN | 105550156 A | 5/2016 |
| CN | 108737007 A | 11/2018 |

OTHER PUBLICATIONS

"Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Internet of Things and Smart Cities, Precision time protocol telecom profile for phase/time synchronization with full timing support from the network," Recommendation ITU-T G.8275.1/Y.1369.1, Telecommunication Standardization Sector of ITU, Total 56 pages, International Telecommunication Union, Geneva, Switzerland (Jun. 2016).

"Series G: Transmission Systems and Media, Digital Systems and Networks, Digital networks—Design objectives for digital networks, Timing characteristics of SDH equipment slave clocks (SEC), Corrigendum 1," ITU-T Recommendation G.813 (2003)—Corrigendum 1, Telecommunication Standardization Sector of ITU, Total 10 pages, International Telecommunication Union, Geneva, Switzerland (Jun. 2005).

* cited by examiner

TIME SYNCHRONIZATION METHOD, SERVICE BOARD, AND NETWORK DEVICE

CROSS-REFERENCE TO RELATED APPLICATIONS

This application is a continuation of International Application No. PCT/CN2020/092757, filed on May 28, 2020, which claims priority to Chinese Patent Application No. 201910471781.5, filed on May 31, 2019. The disclosures of the aforementioned applications are hereby incorporated by reference in their entireties.

TECHNICAL FIELD

This application relates to the field of communications technologies, and in particular, to a time synchronization method, a service board, and a network device.

BACKGROUND

A distributed network device includes a plurality of service boards. One of the service boards serves as a main control board and is configured to implement global control on the distributed network device. Each of other service boards is connected to the main control board, and there is information exchange between service boards connected to each other. In some application scenarios of information exchange, a central processing unit (CPU) of the main control board and a central processing unit of each of the other service boards need to achieve high-precision time synchronization. In other words, a CPU time of the main control board and a CPU time of each of the other service boards need to achieve high-precision time synchronization. For example, in a traffic visualization application scenario, the CPU of each of the other service boards obtains, in real time, traffic forwarded over a physical interface of the service board, and the CPU of the main control board accumulates, in real time, the traffic obtained by each of the other service boards. Therefore, the high-precision time synchronization (at least 1-millisecond synchronization precision) needs to be achieved between the CPU of the main control board and the CPU of each of the other service boards to obtain an accurate traffic visualization result.

In the prior art, a main control board may use a time determined by a clock signal that is generated by a corresponding crystal oscillator as a CPU time of the main control board. Then, the main control board periodically sends broadcast information including the CPU time to each of other service boards. Finally, a CPU of each of the other service boards corrects a CPU time of each of the other service boards based on the received broadcast information, to implement time synchronization with a CPU of the main control board. However, in this time synchronization manner, because message processing of the CPU is usually delayed for more than 10 milliseconds, high-precision time synchronization between the CPU of the main control board and the CPU of each of the other service boards cannot be achieved. Alternatively, the CPU of the main control board and the CPU of each of the other service boards may all perform time synchronization with a same clock source by using a network time protocol (network time protocol, NTP), so as to implement synchronization between the CPU time of the main control board and the CPU time of each of the other service boards. However, in this time synchronization manner, because time synchronization precision of the network time protocol at a network layer can reach 10 milliseconds, even if a priority of an NTP message is improved between the main control board and each of the other service boards, the time synchronization precision can reach only 5 milliseconds. In this manner, high-precision time synchronization between the CPU of the main control board and the CPU of each of the other service boards still cannot be achieved.

Therefore, how to implement high-precision time synchronization between the CPU of the main control board and the CPU of each of the other service boards is a technical problem to be urgently resolved by persons skilled in the art.

SUMMARY

Embodiments of this application provide a time synchronization method, a service board, and a network device, to resolve a problem of how to implement high-precision time synchronization between a CPU of a main control board and a CPU of each of other service boards.

According to a first aspect, an embodiment of this application provides a time synchronization method. The method includes: After clock board times between service boards are synchronized, the service board obtains a CPU time and the clock board time of the service board according to a preset periodicity; and records the obtained CPU time and clock board time, where the CPU time is a time determined based on a clock signal generated by a crystal oscillator corresponding to a CPU of the service board, and the clock board time is a time determined based on a clock signal generated by a clock board of the service board; when performing CPU time synchronization between the service boards, the service board obtains a current CPU time of the service board, and calculates a synchronization time of the CPU based on the current CPU time, and a last recorded CPU time and clock board time; and adjusts the CPU time of the service board to the synchronization time.

According to the time synchronization method provided in this application, after the clock board times between the service boards that need to implement CPU high-precision time synchronization are synchronized by using a high-precision time synchronization protocol, the CPU time of each service board is adjusted to a corresponding synchronization time, so that high-precision time synchronization of CPU times between the service boards can be implemented. It will be appreciated that, provided that according to the time synchronization method provided in this application, a clock board time of a main control board is synchronized with a clock board time of each of other service boards by using the high-precision time synchronization protocol, and then a CPU time of the main control board and a CPU time of each of the other service boards are separately adjusted to a corresponding synchronization time, high-precision time synchronization between a CPU of the main control board and a CPU of each of the other service boards can be implemented.

With reference to the first aspect, in a first possible implementation of the first aspect, the calculating a synchronization time of the CPU based on the current CPU time, and a last recorded CPU time and clock board time includes: calculating the synchronization time by using an expression $C1-=B1-B+A$, where $C1$ indicates the synchronization time, $B1$ indicates the current CPU time, $B$ indicates the last recorded CPU time, and $A$ indicates the last recorded clock board time.

By using the time synchronization method provided in this implementation, after the clock board times between the service boards that need to implement the CPU high-precision time synchronization are synchronized by using the high-precision time synchronization protocol, a synchronization time of each service board is calculated by using the expression C1=B1−B+A, and then the CPU time of each service board is adjusted to the corresponding synchronization time, so that the high-precision time synchronization of the CPU times between the service boards can be implemented, and the synchronization process is simpler.

With reference to the first aspect, in a second possible implementation of the first aspect, before the calculating a synchronization time of the CPU based on the current CPU time, and a last recorded CPU time and clock board time, the method further includes: obtaining a bus access time, where the bus access time refers to duration that a bus is occupied when the clock board time is obtained; and the calculating a synchronization time of the CPU based on the current CPU time, and a last recorded CPU time and clock board time includes: correcting the last recorded clock board time based on the bus access time; and calculating the synchronization time of the CPU by using a corrected clock board time, the current CPU time, and the last recorded CPU time.

The bus access time is used to correct the last recorded clock board time, and then the corrected clock board time is used to calculate the synchronization time, so that the obtained synchronization time is more accurate. Based on this, according to the implementation, after the clock board times between the service boards that need to implement CPU high-precision time synchronization are synchronized by using the high-precision time synchronization protocol, the CPU time of each service board is corrected to the corresponding synchronization time. This can not only implement the high-precision time synchronization between CPUs of the service boards, but also can reduce an error of the high-precision time synchronization, thereby further improving precision and applicability of the time synchronization.

With reference to the first aspect, in a third possible implementation of the first aspect, the correcting the last recorded clock board time based on the bus access time includes: correcting the last recorded clock board time by using an expression A1=A−ΔA, where A1 indicates the corrected clock board time, A indicates the last recorded clock board time, and ΔA indicates the bus access time.

By using the expression A1=A−ΔA, the corrected clock board time can be obtained more quickly and accurately, so that a subsequent time synchronization process is simpler.

With reference to the first aspect, in a fourth possible implementation of the first aspect, the calculating the synchronization time of the CPU by using a corrected clock board time, the current CPU time, and the last recorded CPU time includes: calculating the synchronization time by using an expression C2=B1−B+A1, where C2 indicates the synchronization time, B1 indicates the current CPU time, B indicates the last recorded CPU time, and A1 indicates the corrected clock board time.

By using the expression C2=B1−B+A1, the synchronization time can be calculated more quickly and accurately, so that a subsequent time synchronization process is simpler.

With reference to the first aspect, in a fifth possible implementation of the first aspect, the method further includes: The crystal oscillator outputs a reference pulse signal to a phase-locked loop of the CPU; the phase-locked loop outputs a frequency division clock to a timer of the CPU based on the reference pulse signal; the timer outputs a clock interrupt signal to a processor core of the CPU based on the frequency division clock; and the processor core determines the CPU time based on the clock interrupt signal.

According to the method provided in this implementation, the obtained CPU time is more accurate, so that subsequent time synchronization implemented based on the CPU time is more precise.

With reference to the first aspect, in a sixth possible implementation of the first aspect, the method further includes: synchronizing the clock board times between the service boards by using the high-precision time synchronization protocol.

According to the method provided in this implementation, after the clock board time of each service board that needs to implement the CPU high-precision time synchronization is synchronized by using the high-precision time synchronization protocol, the high-precision time synchronization of the CPU times between the service boards can be implemented as long as the CPU time of each service board is adjusted to the corresponding synchronization time.

According to a second aspect, an embodiment of this application provides a service board. The service board includes a CPU and a clock board. The clock board is configured to synchronize clock board times. The CPU is configured to: after the clock board times are synchronized, obtain a CPU time and the clock board time of the service board according to a preset periodicity; and record the obtained CPU time and clock board time, where the CPU time is a time determined based on a clock signal generated by a crystal oscillator corresponding to the CPU, and the clock board time is a time determined based on a clock signal generated by the clock board; when performing CPU time synchronization between the service boards, obtain a current CPU time of the service board, and calculate a synchronization time of the CPU based on the current CPU time, and a last recorded CPU time and clock board time; and adjust the CPU time of the service board to the synchronization time.

The service board provided in this application may be used as a main control board, or may be used as another service board other than the main control board, for example, an interface board. When high-precision time synchronization between a CPU time on the main control board and a CPU time on each of other service boards needs to be implemented, the main control board and each of the other service boards only need to be set according to the service board provided in this application, and then a clock board time on the main control board and a clock board time on each of the other service boards are synchronized by using a high-precision time synchronization protocol. In this way, the high-precision time synchronization between the CPU of the main control board and the CPU of each of the other service boards can be implemented.

With reference to the second aspect, in a first possible implementation of the second aspect, that the CPU is configured to calculate a synchronization time of the CPU based on the current CPU time, and a last recorded CPU time and clock board time includes: The CPU is configured to calculate the synchronization time by using an expression C1=B1−B+A, where C1 indicates the synchronization time, B1 indicates the current CPU time, B indicates the last recorded CPU time, and A indicates the last recorded clock board time.

After each service board that needs to implement CPU high-precision time synchronization is set according to the service board provided in this implementation, each service board may use the expression C1=B1−B+A to calculate a corresponding synchronization time, thereby simplifying a subsequent synchronization process.

With reference to the second aspect, in a second possible implementation of the second aspect, the CPU is further configured to obtain a bus access time, where the bus access time refers to duration that a bus is occupied when the clock board time is obtained; and that the CPU is configured to calculate a synchronization time of the CPU based on the current CPU time, and a last recorded CPU time and clock board time includes: the CPU is configured to: correct the last recorded clock board time based on the bus access time; and calculate the synchronization time of the CPU by using a corrected clock board time, the current CPU time, and the last recorded CPU time.

The bus access time is used to correct the last recorded clock board time, and then the corrected clock board time is used to calculate the synchronization time, so that the obtained synchronization time is more accurate. Based on this, each service board that needs to implement the high-precision CPU time synchronization is set according to the service board provided in this implementation, and then clock board times between all service boards are synchronized by using the high-precision time synchronization protocol. This can not only implement the high-precision time synchronization between CPU times of the service boards, but also can reduce an error of the high-precision time synchronization, thereby further improving precision and applicability of the time synchronization.

With reference to the second aspect, in a third possible implementation of the second aspect, that the CPU is configured to correct the last recorded clock board time based on the bus access time includes: The CPU is configured to correct the last recorded clock board time by using an expression $A1=A-\Delta A$, where A1 indicates the corrected clock board time, A indicates the last recorded clock board time, and $\Delta A$ indicates the bus access time.

By using the expression $A1=A-\Delta A$, the corrected clock board time can be calculated more quickly and accurately, so that a time synchronization process of the service board is simpler.

With reference to the second aspect, in a fourth possible implementation of the second aspect, that the CPU is configured to calculate the synchronization time of the CPU by using a corrected clock board time, the current CPU time, and the last recorded CPU time includes: The CPU is configured to calculate the synchronization time by using an expression $C2=B1-B+A1$, where C2 indicates the synchronization time, B1 indicates the current CPU time, B indicates the last recorded CPU time, and A1 indicates the corrected clock board time.

By using the expression $C2=B1-B+A1$, the synchronization time can be calculated more quickly and accurately, so that a time synchronization process of the service board is simpler.

With reference to the second aspect, in a fifth possible implementation of the second aspect, the CPU includes: a phase-locked loop, a timer, and a processor core. The phase-locked loop is configured to output a frequency division clock to the timer based on a reference pulse signal output by the crystal oscillator. The timer is configured to output a clock interrupt signal to the processor core based on the frequency division clock. The processor core is configured to determine the CPU time based on the clock interrupt signal.

The service board provided in this implementation obtains a more accurate CPU time. After each service board that needs to implement high-precision CPU time synchronization is set according to the service board provided in this implementation, time synchronization precision is higher.

With reference to the second aspect, in a sixth possible implementation of the second aspect, the clock board is specifically configured to synchronize the clock board times by using the high-precision time synchronization protocol.

After each service board that needs to implement CPU high-precision time synchronization is set according to the service board provided in this implementation, clock board times of all the service boards are synchronized by using the high-precision time synchronization protocol, so that high-precision time synchronization between CPUs of all service boards can be implemented.

According to a third aspect, an embodiment of this application provides a network device. The network device includes the service board in any one of the second aspect or the possible implementations of the second aspect.

According to a fourth aspect, an embodiment of this application provides a network device. The network device includes a first service board and a second service board. The first service board includes a first CPU and a first clock board that are connected to each other. The second service board includes a second CPU and a second clock board that are connected to each other. A clock board time of the first clock board is synchronized with a clock board time of the second clock board. The first CPU and the second CPU are separately configured to: obtain a CPU time and the clock board time of the service board according to a preset periodicity; and record the obtained CPU time and clock board time of the service board, where the CPU time of the service board is a time determined based on a clock signal generated by a crystal oscillator corresponding to the CPU, and the clock board time of the service board is a time determined based on a clock signal generated by the clock board connected to the CPU; when performing CPU time synchronization between the first service board and the second service board, obtain a current CPU time of the service board, and calculate a synchronization time of the CPU based on the current CPU time of the service board, and a last recorded CPU time and clock board time of the service board; and adjust the CPU time of the service board to the synchronization time of the CPU.

According to a fifth aspect, an embodiment of this application provides an apparatus. The apparatus includes a processor, and the processor is configured to: be coupled to a memory, read instructions in the memory, and perform, according to the instructions, the time synchronization method in any one of the first aspect or the various possible implementations of the first aspect.

According to a sixth aspect, an embodiment of this application provides a computer storage medium. The computer storage medium stores instructions, and when the instructions are run on a computer, the computer is enabled to perform some or all steps of the time synchronization method in any one of the first aspect or the various possible implementations of the first aspect.

According to a seventh aspect, an embodiment of this application provides a computer program product. When the computer program product is run on a computer, the computer is enabled to perform some or all steps of the time synchronization method in any one of the first aspect or the various possible implementations of the first aspect.

To achieve high-precision time synchronization between a CPU of a main control board and a CPU of each of other service boards, embodiments of this application provide a time synchronization method, a service board, and a network device. According to the time synchronization method provided in the embodiments of this application, after clock board times between the service boards are synchronized, each service board obtains a CPU time and the clock board time of the service board according to a preset periodicity, and records the obtained CPU time and clock board time. The CPU time is a time determined based on a clock signal generated by the crystal oscillator corresponding to the CPU of the service board, and the clock board time is a time determined based on a clock signal generated by the clock board of the service board. Then, when performing time synchronization between the service boards, the service board obtains a current CPU time of the service board, and calculates a synchronization time of the CPU of the service board based on the current CPU time, and a last recorded CPU time and clock board time. Finally, the service board adjusts the CPU time of the service board to the synchronization time. Based on this, provided that according to the time synchronization method provided in this application, the clock board times between the service boards that need to implement the CPU high-precision time synchronization are synchronized by using a high-precision time synchronization protocol (for example, a high-precision time synchronization protocol version 2 1588V2), and then according to the time synchronization method provided in this application, the CPU time of each service board is adjusted to the corresponding synchronization time, the high-precision time synchronization of the CPU times between the service boards can be implemented.

It will be appreciated that, to implement the high-precision time synchronization between the CPU of the main control board and the CPU of each of the other service boards, provided that according to the time synchronization method provided in this application, the clock board time of the main control board is synchronized with the clock board time of each of the other service boards by using the high-precision time synchronization protocol (for example, the high-precision time synchronization protocol version 2 1588V2), and then according to the time synchronization method provided in this application, the CPU time of the main control board and the CPU time of each of the other service boards are separately adjusted to the corresponding synchronization time, the high-precision time synchronization between the CPU of the main control board and the CPU of each of the other service boards can be implemented.

DESCRIPTION OF EMBODIMENTS

The following describes technical solutions of this application with reference to accompanying drawings.

Before technical solutions of this application are described, a technical scenario of this application is first described with reference to the accompanying drawings.

A time synchronization network is a network that can implement time synchronization between a plurality of network devices. The time synchronization network includes each node clock and a timing link that transmits a synchronous clock signal, and can accurately transmit the synchronous clock signal from a reference clock to each node clock in the time synchronization network. In this way, each node clock in the time synchronization network is adjusted to achieve clock signal synchronization. A time synchronization network adopts a master-slave synchronization mode. Clocks of all network elements in the time synchronization network are all synchronized to a same or a plurality of central reference sources (reference clocks) to implement clock signal synchronization.

Figure 1:
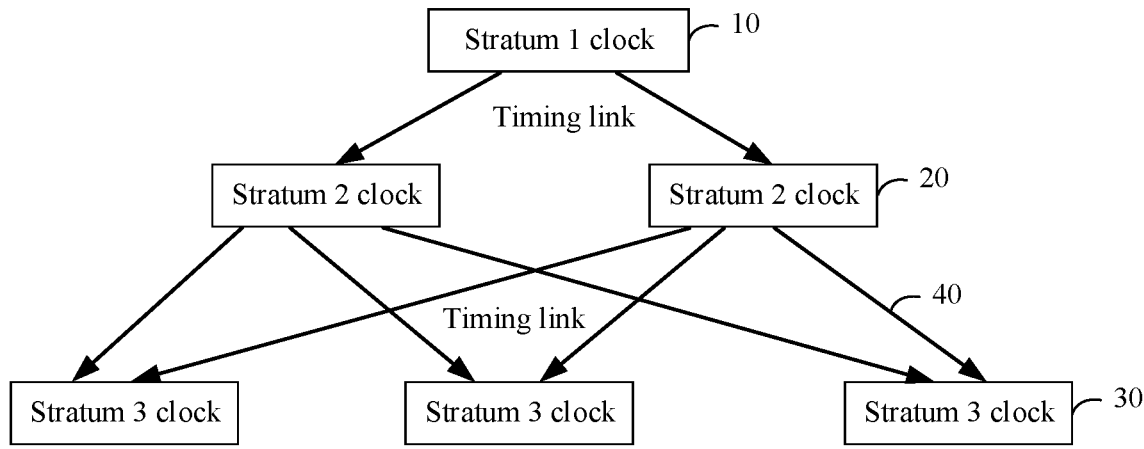
FIG. 1 is a schematic structural diagram of an implementation of a time synchronization network according to an embodiment of this application.

The following describes a structure of the time synchronization network with reference to FIG. 1.

FIG. 1 is a schematic structural diagram of an implementation of a time synchronization network according to this application. With reference to FIG. 1, it will be appreciated that the time synchronization network includes a stratum 1 clock 10 (stratum 1), a stratum 2 clock server 20 (stratum 2), and a stratum 3 clock server 30 (stratum 3). The stratum 1 clock 10 is a reference clock, and is configured to provide a reference clock signal. Generally, an atomic clock (for example, a cesium atomic clock) with relatively high stability is used as the stratum 1 clock 10. The stratum 2 clock server 20 is connected to the stratum 1 clock 10 through a timing link 40, and is configured to receive a synchronous clock signal from the stratum 1 clock 10, and transmit the synchronous clock signal to a local device or the stratum 3 clock server 30. Generally, a rubidium clock is used as the stratum 2 clock server 20, and the stratum 2 clock server 20 may also be referred to as a stratum 2 clock for short. The stratum 3 clock server 30 is connected to one or more stratum 2 clock servers 20 through the timing link 40, and is configured to receive the synchronous clock signal from the stratum 2 clock server 20, and transmit the synchronous clock signal to the local device. Generally, a crystal clock is used as the stratum 3 clock server 30, and the stratum 3 clock server 30 may also be referred to as a stratum 3 clock for short.

A distributed network device includes a plurality of service boards. One service board serves as a main control board and is configured to implement global control on the distributed network device, and each of other service boards is connected to the main control board. A hardware clock apparatus may be disposed on each service board of the distributed network device. In this embodiment of this application, the hardware clock apparatus is referred to as a clock board for short. Different service boards of the distributed network device or service boards of different distributed network devices can implement time synchronization between clock boards through the time synchronization network. In the distributed network device, the clock board of each service board may receive the synchronous clock signal from the stratum 3 clock server in the time synchronization network, and correct a clock signal of a system based on the synchronous clock signal, so as to implement time synchronization between each other through the time synchronization network. For example, high-precision time synchronization may be implemented between the clock boards of the service boards of the distributed network device through a time synchronization network by using a high-precision time synchronization protocol version 2 1588V2. In addition, the high-precision time synchronization may also be implemented between service boards of different distributed network devices through the time synchronization network by using the high-precision time synchronization protocol version 2 1588V2.

However, the time synchronization network can only implement high-precision time synchronization between the clock boards of different service boards, but cannot implement high-precision time synchronization between CPUs of different service boards. Based on this, this application provides a time synchronization method, and the high-precision time synchronization between the CPUs of different service boards can be implemented by using the time synchronization method.

The following describes embodiments of the technical solutions of this application.

Figure 2:
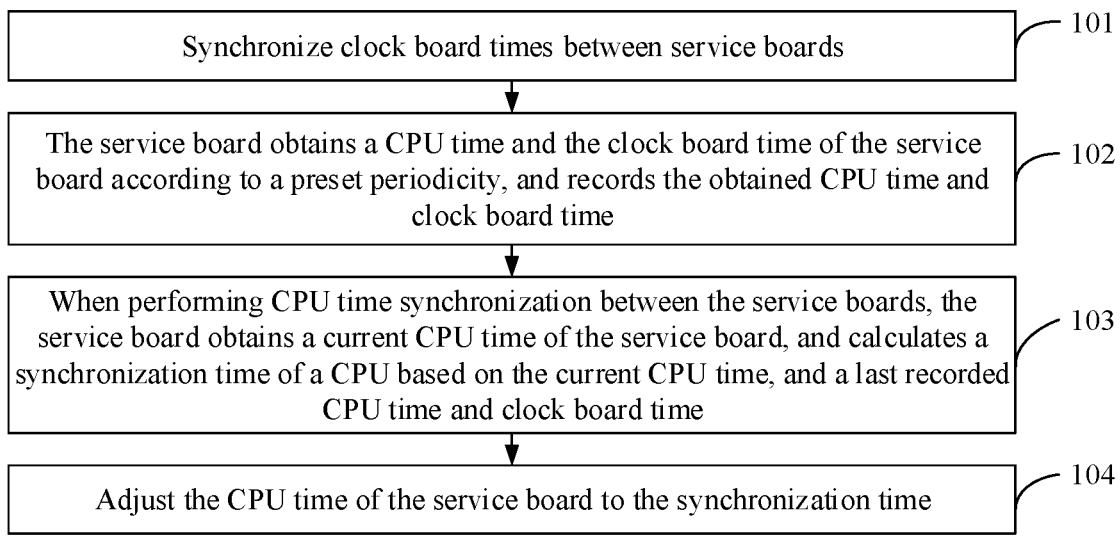
FIG. 2 is a schematic flowchart of an implementation of a time synchronization method according to an embodiment of this application.

FIG. 2 is a schematic flowchart of an implementation of a time synchronization method according to this application. With reference to FIG. 2, it will be appreciated that the time synchronization method includes the following steps.

Step 101: Synchronize clock board times between service boards.

There are at least two service boards. The two service boards may be different service boards of a same distributed network device, or may belong to different distributed network devices. This is not limited in this application. For example, the two service boards may be a main control board and an interface board of a same distributed network device. Alternatively, one of the service boards may be a main control board of a first distributed network device, and the other service board may be a main control board of a second distributed network device.

Optionally, in order to implement subsequent high-precision time synchronization of CPU times between the service boards, a high-precision time synchronization protocol, for example, a high-precision time synchronization protocol version 2 1588V2, may be used to synchronize the clock board times between the service boards.

Further, that a high-precision time synchronization protocol is used to synchronize the clock board times between the service boards may be implemented in the following manner: The clock board of each service board receives a synchronous clock signal through a time synchronization network based on the high-precision time synchronization protocol (for example, the high-precision time synchronization protocol version 2 1588V2), and then corrects the clock board time of the clock board based on the synchronous clock signal, thereby synchronizing the clock board times between the service boards.

Step 102: The service board obtains the CPU time and the clock board time of the service board according to a preset periodicity, and records the obtained CPU time and clock board time.

The CPU time is a time determined based on a clock signal generated by a crystal oscillator corresponding to a CPU of the service board. The clock board time is a time determined based on a clock signal generated by the clock board of the service board.

The preset periodicity may be set based on a requirement of an actual application scenario. For example, the preset periodicity may be set to a value range of 10 milliseconds to 1 second. Optionally, in this embodiment of this application, the preset periodicity may be set to 10 milliseconds (ms).

After obtaining the CPU time and the clock board time of each service board according to the preset periodicity each time, each service board may record the obtained CPU time and clock board time. Alternatively, after obtaining the CPU time and the clock board time each time, each service board may record the CPU time and the clock board time that are obtained this time and overwrite the CPU time and the clock board time that are recorded last time.

Figure 3:
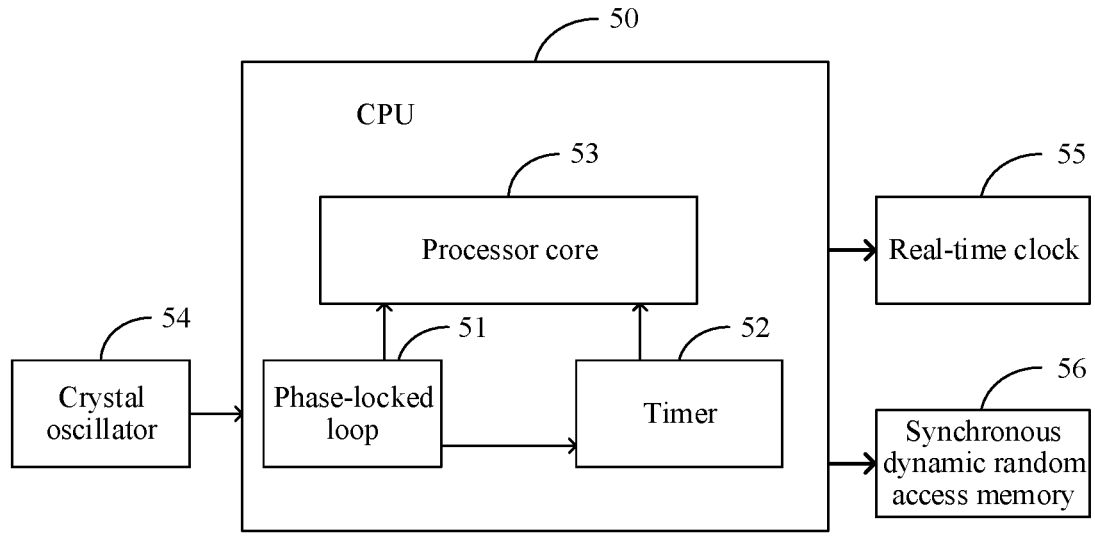
FIG. 3 is a schematic structural diagram of an implementation of a CPU of a service board according to an embodiment of this application.

After being powered on, a CPU of each service board determines, in real time, the CPU time of the service board based on the clock signal generated by the crystal oscillator corresponding to the CPU. Optionally, for a specific implementation in which the CPU of each service board determines the CPU time of the service board, refer to the embodiments shown in FIG. 3 and FIG. 4. FIG. 3 is a schematic structural diagram of an implementation of a CPU of a service board according to this application, and FIG. 4 is a schematic flowchart of an implementation of a method in which a CPU of a service board determines a CPU time of the service board according to this application.

With reference to FIG. 3, it will be appreciated that a CPU 50 of each service board may include a phase-locked loop (PLL) 51, a timer 52, and a processor core 53. The phase-locked loop 51 is configured to receive a reference pulse signal output by a crystal oscillator 54, and output a frequency division clock to the timer 52 based on the reference pulse signal. The timer 52 is configured to output a clock interrupt signal to the processor core 53 based on the frequency division clock transmitted by the phase-locked loop 51. The processor core 53 is configured to: determine a CPU time based on the clock interrupt signal transmitted by the timer 52, write the CPU time into a real-time clock (RTC) 55, and store the CPU time into a synchronous dynamic random access memory (double data rate, DDR) 56.

Figure 4:
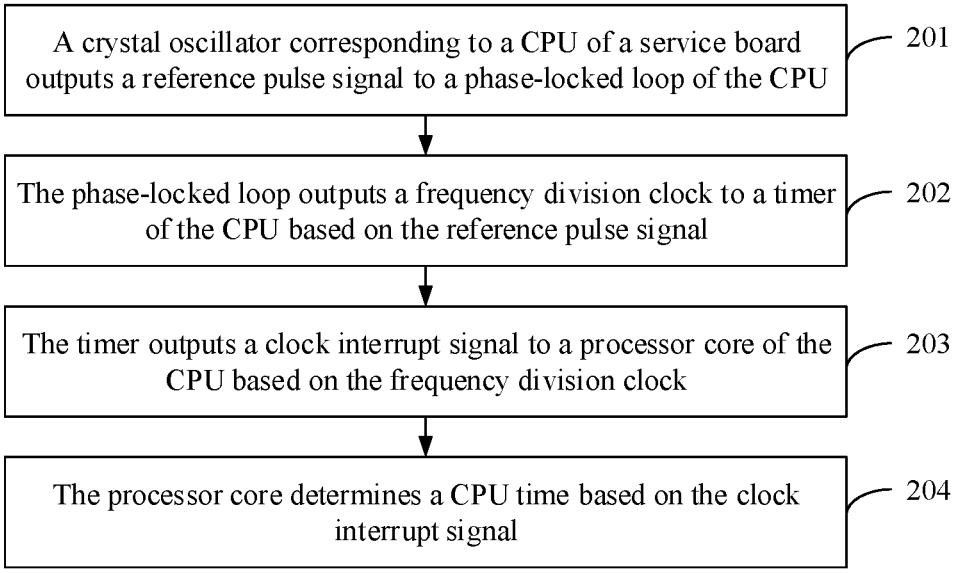
FIG. 4 is a schematic flowchart of an implementation of a method in which a CPU of a service board determines a CPU time of the service board according to an embodiment of this application.

Based on the CPU structure of the service board shown in FIG. 3, with reference to FIG. 4, it will be appreciated that a CPU of each service board may determine a CPU time according to the following steps:

Step 201: A crystal oscillator corresponding to a CPU of a service board outputs a reference pulse signal to a phase-locked loop of the CPU.

Step 202: The phase-locked loop outputs a frequency division clock to a timer of the CPU based on the reference pulse signal.

Step 203: The timer outputs a clock interrupt signal to a processor core of the CPU based on the frequency division clock.

Step 204: The processor core determines a CPU time based on the clock interrupt signal.

In addition, after clock board times between service boards are synchronized, the clock board of each service board corrects, in real time, a clock signal of a system of the service board based on a received clock synchronization signal, and determines the clock board time of the service board based on a corrected clock signal of the system of the service board.

In some optional embodiments, after the clock board times between the service boards are synchronized, each service board may calculate, in real time, a synchronization time of a CPU of the service board based on the clock board time of the service board, and then correct a CPU time of the service board to the synchronization time. However, if the service board corrects the CPU time of the service board according to this implementation, the CPU is occupied for a relatively long time. If this implementation is used for a long time, subsequent high-precision time synchronization between CPU times of the service boards cannot be implemented.

To resolve this problem, in some other optional embodiments, after the clock board times between the service boards are synchronized, each service board reads the CPU time and the clock board time of the service board according to a preset periodicity, namely, at intervals of a specific duration (for example, 10 milliseconds), and records the read CPU time and clock board time. A recording manner may be referred to the content of the foregoing embodiment. Details are not described herein again. In this way, each service board corrects the CPU time of the service board based on the recorded CPU time and clock board time. This reduces CPU occupation duration and ensures high-precision time synchronization of the CPU times between service boards. For specific content, refer to content of the following embodiments. Details are not described herein again.

Step 103: When performing CPU time synchronization between the service boards, the service board obtains a current CPU time of the service board, and calculates a synchronization time of the CPU based on the current CPU time, and a last recorded CPU time and clock board time.

The current CPU time of the service board is a time determined by a clock signal currently generated by a crystal oscillator corresponding to the CPU of the service board when the CPU time synchronization between the service boards is performed. The last recorded CPU time refers to a CPU time recorded most recently by the service board when the CPU time synchronization between the service boards is performed. The last recorded clock board time refers to a clock board time recorded most recently by the service board when the CPU time synchronization between the service boards is performed.

Optionally, a trigger condition for performing the CPU time synchronization between the service boards may be that the service board obtains the CPU time and the clock board time of the service board each time according to a preset periodicity.

Optionally, a trigger condition for performing the CPU time synchronization between the service boards may further be receiving a synchronization instruction.

Optionally, a trigger condition for performing the CPU time synchronization between the service boards may further be receiving a reading instruction, for example, receiving a reading instruction from another device or application for reading the CPU time of the service board.

It should be noted that the trigger condition for performing the CPU time synchronization between the service boards is not limited to the content listed in this embodiment, and may also be set to other content based on an actual application scenario. This is not limited in this application.

In some optional embodiments, that the service board calculates a synchronization time of the CPU based on the current CPU time, and a last recorded CPU time and clock board time may be implemented in the following manner: calculating the synchronization time by using an expression $C1=B1-B+A$, where $C1$ indicates the synchronization time, $B1$ indicates the current CPU time, $B$ indicates the last recorded CPU time, and $A$ indicates the last recorded clock board time.

Step 104: Adjust the CPU time of the service board to the synchronization time.

According to the time synchronization method provided in the embodiments of this application, after the clock board times between the service boards are synchronized, each service board obtains the CPU time and the clock board time of the service board according to the preset periodicity, and records the obtained CPU time and clock board time. The CPU time is a time determined based on the clock signal generated by the crystal oscillator corresponding to the CPU of the service board, and the clock board time is a time determined based on the clock signal generated by the clock board of the service board. Then, when performing time synchronization between the service boards, the service board obtains the current CPU time of the service board, and calculates a synchronization time of the CPU of the service board based on the current CPU time, and the last recorded CPU time and clock board time. Finally, the service board adjusts the CPU time of the service board to the synchronization time.

If the high-precision time synchronization protocol is used to synchronize the clock board times between the service boards, a synchronization error of the clock board times between the service boards is at a nanosecond (ns) level. When the CPU obtains the clock board time through a bus, a bus access time is at a microsecond (p.$) level. If the CPU obtains a CPU time every 1 millisecond, the error is 0.115 microsecond. If the CPU obtains a CPU time every 10 milliseconds (ms), the error is 1.15 microsecond. Based on this, according to the time synchronization method provided in this application, the clock board times between the service boards are synchronized by using the high-precision time synchronization protocol, and then the CPU time of each service board is adjusted to a corresponding synchronization time, so that CPU time synchronization between the service boards can be implemented, and an error of time synchronization is at a microsecond level. This meets a requirement of the high-precision time synchronization.

Therefore, provided that according to the time synchronization method provided in this application, the clock board times between the service boards that need to implement the CPU high-precision time synchronization are synchronized by using the high-precision time synchronization protocol (for example, the high-precision time synchronization protocol version 2 1588V2), and then according to the time synchronization method provided in this application, the CPU time of each service board is adjusted to the corresponding synchronization time, the high-precision time synchronization of the CPU times between the service boards can be implemented.

It will be appreciated that, to implement the high-precision time synchronization between the CPU of the main control board and the CPU of each of the other service boards, provided that according to the time synchronization method provided in this application, the clock board time of the main control board is synchronized with the clock board time of each of the other service boards by using the high-precision time synchronization protocol (for example, the high-precision time synchronization protocol version 2 1588V2), and then according to the time synchronization method provided in this application, the CPU time of the main control board and the CPU time of each of the other service boards are separately adjusted to the corresponding synchronization time, high-precision time synchronization between the CPU of the main control board and the CPU of each of the other service boards can be implemented.

Figure 5:
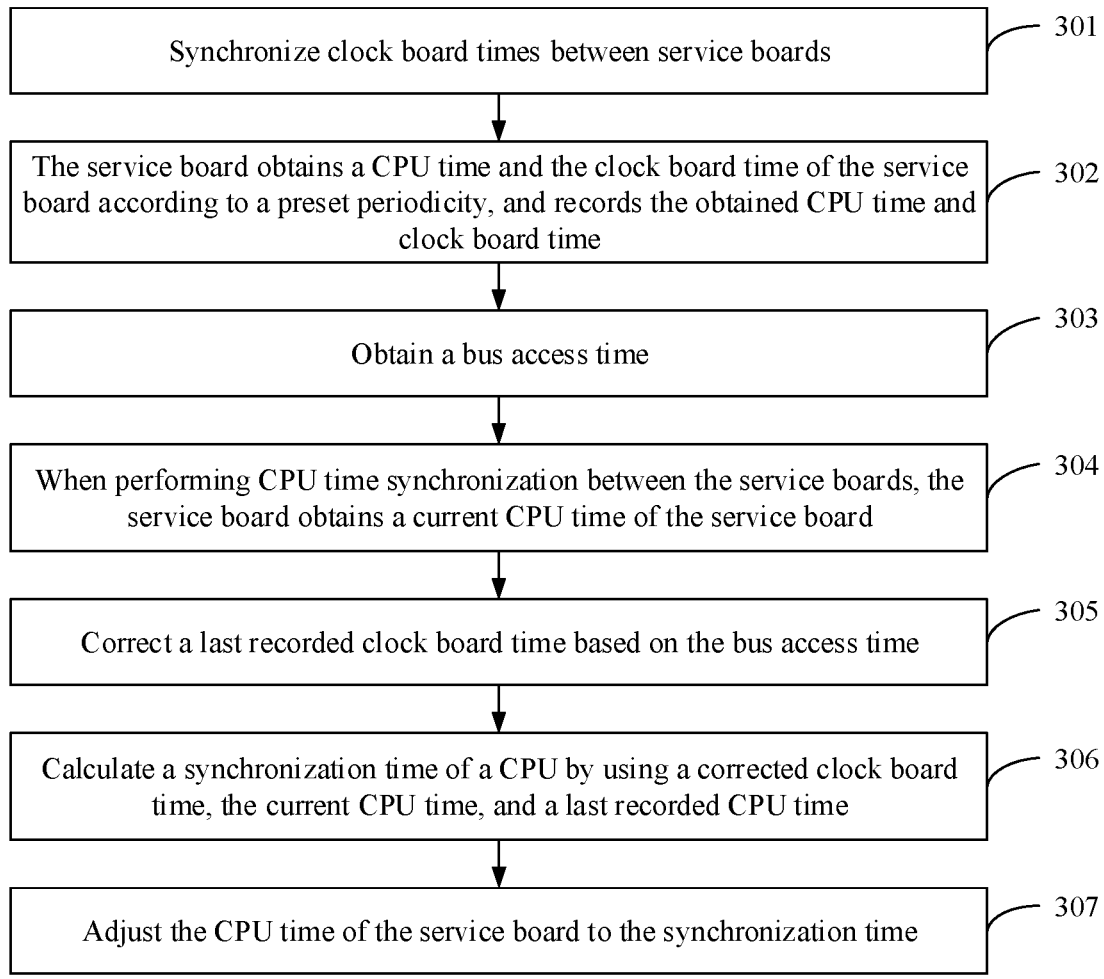
FIG. 5 is a schematic flowchart of another implementation of a time synchronization method according to an embodiment of this application.

FIG. 5 is a schematic flowchart of another implementation of a time synchronization method according to this application. With reference to FIG. 5, it will be appreciated that the time synchronization method includes the following steps.

Step 301: Synchronize clock board times between service boards.

Optionally, the synchronizing clock board times between service boards may be implemented in the following manner: A high-precision time synchronization protocol, for example, a high-precision time synchronization protocol version 2 1588V2, may be used to synchronize the clock board times between the service boards. Further, for a specific implementation of synchronizing the clock board times between the service boards by using the high-precision time synchronization protocol, refer to the content of the embodiment shown in FIG. 2. Details are not described herein again.

Step 302: The service board obtains a CPU time and the clock board time of the service board according to a preset periodicity, and records the obtained CPU time and clock board time.

The CPU time is a time determined based on a clock signal generated by a crystal oscillator corresponding to a CPU of the service board, and the clock board time is a time determined based on a clock signal generated by the clock board of the service board.

The preset periodicity may be set based on a requirement of an actual application scenario. For example, the preset periodicity may be set to a value range of 10 milliseconds to 1 second. Optionally, in this embodiment of this application, the preset periodicity may be set to 10 milliseconds (ms).

After obtaining the CPU time and the clock board time of each service board according to the preset periodicity each time, each service board may record the obtained CPU time and clock board time. Alternatively, after obtaining the CPU time and the clock board time each time, each service board may record the CPU time and the clock board time that are obtained this time and overwrite the CPU time and the clock board time that are recorded last time.

During specific implementation, for a specific implementation of step 302, refer to the content of the embodiment shown in FIG. 1. Details are not described herein again.

Step 303: Obtain a bus access time.

The bus access time refers to duration that a bus is occupied when the clock board time is obtained.

Step 304: When performing CPU time synchronization between the service boards, the service board obtains a current CPU time of the service board.

The current CPU time of the service board refers to a time determined by a clock signal currently generated by a crystal oscillator corresponding to the CPU of the service board when the CPU time synchronization between the service boards is performed.

Optionally, a trigger condition for performing the CPU time synchronization between the service boards may be that the service board obtains the CPU time and the clock board time of the service board according to a preset periodicity each time.

Optionally, a trigger condition for performing the CPU time synchronization between the service boards may further be receiving a synchronization instruction.

Optionally, a trigger condition for performing the CPU time synchronization between the service boards may further be receiving a reading instruction, for example, receiving a reading instruction from another device or application for reading the CPU time of the service board.

It should be noted that the trigger condition for performing the CPU time synchronization between the service boards is not limited to the content listed in this embodiment, and may also be set to other content based on an actual application scenario. This is not limited in this application.

Step 305: Correct a last recorded clock board time based on the bus access time.

The last recorded clock board time refers to a clock board time recorded most recently by the service board when the CPU time synchronization between the service boards is performed.

In some optional embodiments, the correcting the last recorded clock board time based on the bus access time may be implemented in the following manner: correcting the last recorded clock board time by using an expression $A1=A-\Delta A$, where $A1$ indicates the corrected clock board time, $A$ indicates the last recorded clock board time, and $\Delta A$ indicates the bus access time.

Step 306: Calculate a synchronization time of the CPU by using the corrected clock board time, the current CPU time, and a last recorded CPU time.

The last recorded CPU time refers to a CPU time recorded most recently by the service board when the CPU time synchronization between the service boards is performed.

In some optional embodiments, the calculating the synchronization time of the CPU by using the corrected clock board time, the current CPU time, and the last recorded CPU time may be implemented in the following manner: calculating the synchronization time by using an expression $C2=B1-B+A1$, where $C2$ indicates the synchronization time, $B1$ indicates the current CPU time, $B$ indicates the last recorded CPU time, and $A1$ indicates the corrected clock board time.

Step 307: Adjust the CPU time of the service board to the synchronization time.

According to the time synchronization method provided in this embodiment, first, the clock board times between the service boards are synchronized. Next, each service board obtains the CPU time and the clock board time of the service board according to the preset periodicity, and records the obtained CPU time and clock board time, where the CPU time is a time determined based on the clock signal generated by the crystal oscillator corresponding to the CPU of the service board, and the clock board time is a time determined based on the clock signal generated by the clock board of the service board; and obtains the bus access time. Then, when performing time synchronization between the service boards, the service board obtains the current CPU time of the service board, corrects the last recorded clock board time based on the bus access time, and calculates a synchronization time of the CPU of the service board by using the corrected clock board time, the current CPU time, and the last recorded CPU time. Finally, the service board adjusts the CPU time of the service board to the synchronization time. Based on this, provided that according to the time synchronization method provided in this embodiment, the clock board times between the service boards that need to implement the CPU high-precision time synchronization are synchronized by using the high-precision time synchronization protocol (for example, the high-precision time synchronization protocol version 2 1588V2), and then according to the time synchronization method provided in this embodiment, the CPU time of each service board is adjusted to the corresponding synchronization time, the high-precision time synchronization of the CPU times between the service boards can be implemented.

In addition, in the time synchronization method provided in this embodiment, the bus access time is used to correct the last recorded clock board time, and then the corrected clock board time is used to calculate the synchronization time, so that the obtained synchronization time is more accurate. Based on this, according to the time synchronization method provided in this embodiment, after the clock board times between the service boards that need to implement CPU high-precision time synchronization are synchronized by using the high-precision time synchronization protocol, the CPU time of each service board is corrected to the corresponding synchronization time. This can not only implement the high-precision time synchronization between CPUs of the service boards, but also can reduce an error of the high-precision time synchronization, thereby further improving precision and applicability of the time synchronization.

It will be appreciated that, to implement high-precision time synchronization between a CPU of a main control board and a CPU of each of other service boards, provided that according to the time synchronization method provided in this embodiment, the clock board time of the main control board is synchronized with the clock board time of each of the other service boards by using the high-precision time synchronization protocol (for example, the high-precision time synchronization protocol version 2 1588V2), and then according to the time synchronization method provided in this embodiment, a CPU time of the main control board and a CPU time of each of the other service boards are separately adjusted to a corresponding synchronization time, high-precision time synchronization between the CPU of the main control board and the CPU of each of the other service boards can be implemented. In addition, according to the time synchronization method provided in this embodiment, the precision and applicability of the time synchronization can be further improved.

The following describes apparatus embodiments corresponding to the foregoing method embodiments.

Figure 6:
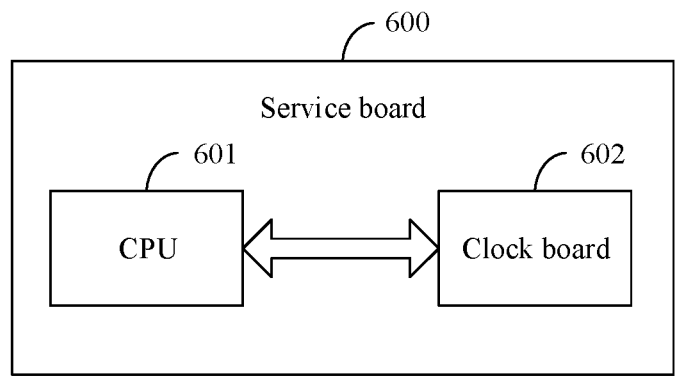
FIG. 6 is a structural block diagram of an implementation of a service board according to an embodiment of this application.

FIG. 6 is a structural block diagram of an implementation of a service board according to this application. With reference to FIG. 6, it will be appreciated that the service board 600 may include a CPU 601 and a clock board 602. The clock board 602 is configured to synchronize clock board times. The CPU 601 is specifically configured to:
- after the clock board times are synchronized, obtain a CPU time and the clock board time of the service board according to a preset periodicity; and record the obtained CPU time and clock board time, where the CPU time is a time determined based on a clock signal generated by a crystal oscillator corresponding to the CPU 601, and the clock board time is a time determined based on a clock signal generated by the clock board 602;
- when performing CPU time synchronization between the service boards, obtain a current CPU time of the service board, and calculate a synchronization time of the CPU 601 based on the current CPU time, and a last recorded CPU time and clock board time; and adjust the CPU time of the service board 600 to the synchronization time.

The service board provided in this application may be used as a main control board, or may be used as another service board other than the main control board, for example, an interface board. When high-precision time synchronization between a CPU of the main control board and a CPU of each of other service boards needs to be implemented, the main control board and each of the other service boards only need to be set according to the service board provided in this application, and then a clock board time of the main control board and a clock board time of each of the other service boards are synchronized by using a high-precision time synchronization protocol. In this way, the high-precision time synchronization between the CPU of the main control board and the CPU of each of the other service boards can be implemented.

It should be noted that the main control board that needs to implement CPU high-precision time synchronization and each of the other service boards may be a main control board and a service board of a same distributed network device, or may belong to different network devices. This is not limited in this application.

Optionally, that the CPU 601 is configured to calculate a synchronization time of the CPU based on the current CPU time, and a last recorded CPU time and clock board time includes: the CPU 601 is configured to calculate the synchronization time by using an expression $C1=B1-B+A$, where C1 indicates the synchronization time, B1 indicates the current CPU time, B indicates the last recorded CPU time, and A indicates the last recorded clock board time.

Optionally, the CPU 601 is further configured to: obtain a bus access time, where the bus access time refers to duration that a bus is occupied when the clock board time is obtained; and that the CPU 601 is configured to calculate a synchronization time of the CPU based on the current CPU time, and a last recorded CPU time and clock board time includes: the CPU 601 is configured to: correct the last recorded clock board time based on the bus access time; and calculate the synchronization time of the CPU by using a corrected clock board time, the current CPU time, and the last recorded CPU time.

Optionally, that the CPU 601 is configured to correct the last recorded clock board time based on the bus access time includes: the CPU 601 is configured to correct the last recorded clock board time by using an expression $A1=A-\Delta A$, where A1 indicates the corrected clock board time, A indicates the last recorded clock board time, and $\Delta A$ indicates the bus access time.

Optionally, that the CPU 601 is configured to calculate the synchronization time of the CPU by using a corrected clock board time, the current CPU time, and the last recorded CPU time includes: the CPU 601 is configured to calculate the synchronization time by using an expression $C2=B1-B+A1$, where C2 indicates the synchronization time, B1 indicates the current CPU time, B indicates the last recorded CPU time, and A1 indicates the corrected clock board time.

Optionally, the CPU 601 includes: a phase-locked loop, a timer, and a processor core. The phase-locked loop is configured to output a frequency division clock to the timer based on a reference pulse signal output by the crystal oscillator. The timer is configured to output a clock interrupt signal to the processor core based on the frequency division clock. The processor core is configured to determine the CPU time based on the clock interrupt signal. Specifically, for a specific structure of the CPU 601, refer to the content of the embodiment shown in FIG. 3.

Optionally, the clock board 602 is specifically configured to synchronize the clock board times by using the high-precision time synchronization protocol.

This application further provides a network device. The network device may include the service board 600 provided in the embodiment shown in FIG. 6.

Figure 7:
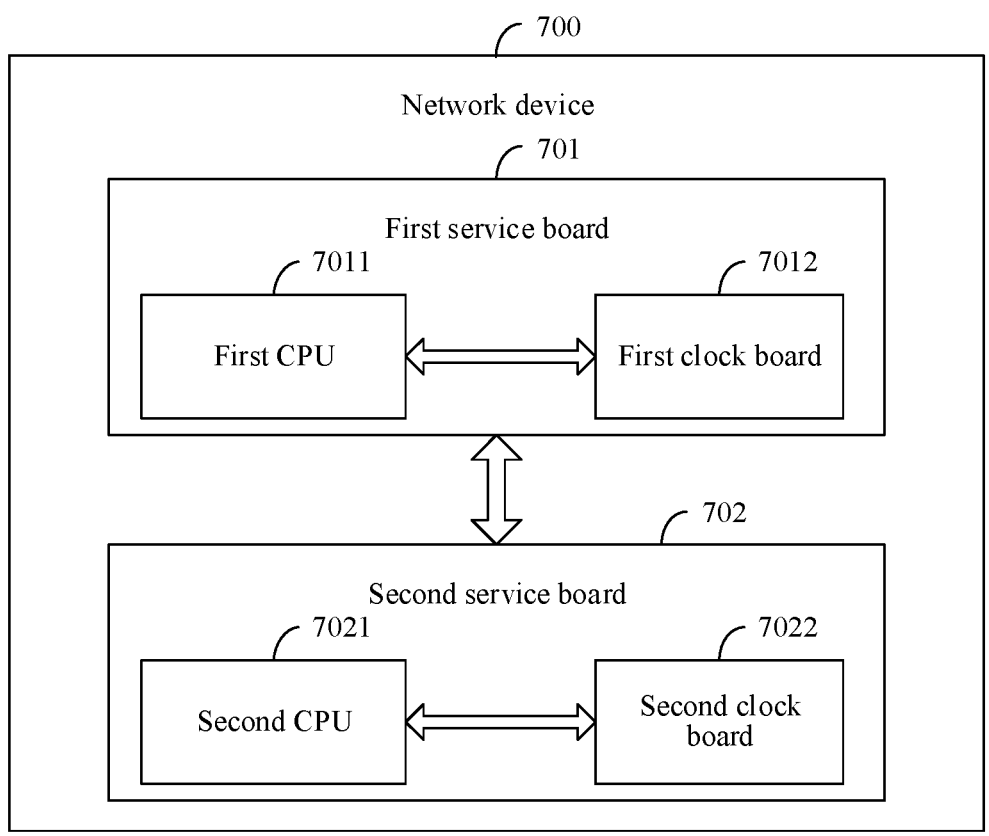
FIG. 7 is a structural block diagram of an implementation of a network device according to an embodiment of this application.

This application further provides a network device. For details, refer to FIG. 7. FIG. 7 is a structural block diagram of an implementation of the network device according to this application. With reference to FIG. 7, it will be appreciated that the network device 700 may include a first service board 701 and a second service board 702. The first service board 701 and the second service board 702 may be connected through a bus, or may be connected in another manner. This is not limited in this application.

The first service board 701 includes a first CPU 7011 and a first clock board 7012 that are connected to each other. The second service board 702 includes a second CPU 7021 and a second clock board 7022 that are connected to each other. A clock board time of the first clock board 7012 is synchronized with a clock board time of the second clock board 7022. The first CPU 7011 and the second CPU 7021 are separately configured to: obtain a CPU time and the clock board time of the service board according to a preset periodicity; and record the obtained CPU time and clock board time of the service board, where the CPU time of the service board is a time determined based on a clock signal generated by a crystal oscillator corresponding to the CPU, and the clock board time of the service board is a time determined based on a clock signal generated by the clock board connected to the CPU; when performing CPU time synchronization between the first service board 701 and the second service board 702, obtain a current CPU time of the service board, and calculate a synchronization time of the CPU based on the current CPU time of the service board, and a last recorded CPU time and clock board time of the service board; and adjust the CPU time of the service board to the synchronization time of the CPU.

The network device provided in this embodiment may implement the time synchronization methods shown in FIG. 2 and FIG. 5, and obtain a same beneficial effect.

During specific implementation, the embodiment of this application further provides a computer storage medium. The computer storage medium may store a program, the program includes instructions, and when the program is executed, some or all of the steps of the time synchronization method provided in this application may be included. The computer storage medium may be a magnetic disk, an optical disc, a read-only memory (read-only memory, ROM), a random access memory (random access memory, RAM), or the like.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive (solid state disk, SSD)), or the like.

The service board, the network device, and the computer storage medium are configured to perform some or all steps of the time synchronization method provided in any embodiment, and correspondingly have beneficial effects of the foregoing time synchronization method. Details are not described herein again.

It should be understood that, in the embodiments of this application, an execution sequence of the steps should be determined based on functions and internal logic of the steps, and sequence numbers of the steps do not mean the execution sequence, and do not constitute a limitation on an implementation process of the embodiments.

In addition, in the descriptions of this application, "a plurality of" means two or more than two unless otherwise specified. In addition, for convenience of clear description of the technical solutions in the embodiments of this application, in the embodiments of this application, terms such as "first", "second", and the like are used to distinguish between same objects or similar objects whose functions and purposes are basically the same. Persons skilled in the art may understand that the terms such as "first" and "second" do not limit a quantity or an execution sequence, and the terms such as "first" and "second" do not indicate a definite difference.

For embodiments in this specification described in a progressive manner, for same or similar parts in the embodiments, refer to prior embodiments, and each embodiment focuses on a difference from other embodiments. Especially, the embodiments of the service board and the network device may be similar to the method embodiments, and therefore may be described briefly. For related parts, refer to descriptions in the method embodiments.

Although some preferred embodiments of this application have been described, it will be appreciated that persons skilled in the art can make changes and modifications to these embodiments. Therefore, the following claims are intended to be construed as to cover the preferred embodiments and all changes and modifications falling within the scope of this application.

The foregoing descriptions are exemplary implementations of this application, but are not intended to limit the protection scope of this application.

What is claimed is:

1. A time synchronization method, comprising:
after clock board times between service boards are synchronized, obtaining, by a service board of the service boards, a central processing unit (CPU) time and a clock board time of the service board according to a preset periodicity, wherein the CPU time is based on a clock signal generated by a crystal oscillator corresponding to a CPU of the service board, and the clock board time is based on a clock signal generated by a clock board of the service board;
recording, by the service board, the obtained CPU time and the obtained clock board time;
for performing CPU time synchronization between the service boards, obtaining, by the service board, a current CPU time of the service board, and calculating a synchronization time of the CPU based on the current CPU time, a last recorded CPU time, and a last recorded clock board time; and
adjusting, by the service board, the CPU time of the service board to the synchronization time.

2. The time synchronization method according to claim 1, wherein calculating the synchronization time of the CPU comprises:

calculating the synchronization time by using an expression $C1=B1-B+A$, wherein C1 indicates the synchronization time, B1 indicates the current CPU time, B indicates the last recorded CPU time, and A indicates the last recorded clock board time.

3. The time synchronization method according to claim 1, wherein before calculating the synchronization time of the CPU, the method further comprises:
obtaining a bus access time, wherein the bus access time refers to a duration during which a bus is occupied while the clock board time is obtained; and
wherein calculating the synchronization time of the CPU comprises:
correcting the last recorded clock board time based on the bus access time; and
calculating the synchronization time of the CPU by using the corrected clock board time, the current CPU time, and the last recorded CPU time.

4. The time synchronization method according to claim 3, wherein correcting the last recorded clock board time comprises:
correcting the last recorded clock board time by using an expression $A1=A-\Delta A$, wherein A1 indicates the corrected clock board time, A indicates the last recorded clock board time, and $\Delta A$ indicates the bus access time.

5. The time synchronization method according to claim 4, wherein calculating the synchronization time of the CPU comprises:
calculating the synchronization time by using an expression $C2=B1-B+A1$, wherein C2 indicates the synchronization time, B1 indicates the current CPU time, B indicates the last recorded CPU time, and A1 indicates the corrected clock board time.

6. The time synchronization method according to claim 1, wherein the method further comprises:
synchronizing the clock board times between the service boards by using a high-precision time synchronization protocol.

7. A service board, comprising:
a central processing unit (CPU); and
a clock board;
wherein the clock board is configured to synchronize clock board times between service boards; and
wherein the CPU is configured to:
after the clock board times are synchronized, obtain a CPU time and a clock board time of the service board according to a preset periodicity, wherein the CPU time is based on a clock signal generated by a crystal oscillator corresponding to the CPU of the service board, and the clock board time is based on a clock signal generated by the clock board of the service board;
record the obtained CPU time and the obtained clock board time;
for performing CPU time synchronization between the service boards, obtain a current CPU time of the service board, and calculate a synchronization time of the CPU based on the current CPU time, and a last recorded CPU time, and a last recorded clock board time; and
adjust the CPU time of the service board to the synchronization time.

8. The service board according to claim 7, wherein calculating the synchronization time of the CPU comprises:
calculating the synchronization time by using an expression $C1=B1-B+A$, wherein C1 indicates the synchronization time, B1 indicates the current CPU time, B indicates the last recorded CPU time, and A indicates the last recorded clock board time.

9. The service board according to claim 7, wherein the CPU is further configured to:
obtain a bus access time, wherein the bus access time refers to a duration during which a bus is occupied while the clock board time is obtained; and
wherein calculating the synchronization time of the CPU comprises:
correcting the last recorded clock board time based on the bus access time; and
calculating the synchronization time of the CPU by using a corrected clock board time, the current CPU time, and the last recorded CPU time.

10. The service board according to claim 9, wherein correcting the last recorded clock board time comprises:
correcting the last recorded clock board time by using an expression $A1=A-\Delta A$, wherein A1 indicates the corrected clock board time, A indicates the last recorded clock board time, and $\Delta A$ indicates the bus access time.

11. The service board according to claim 10, wherein calculating the synchronization time of the CPU comprises:
calculating the synchronization time by using an expression $C2=B1-B+A1$, wherein C2 indicates the synchronization time, B1 indicates the current CPU time, B indicates the last recorded CPU time, and A1 indicates the corrected clock board time.

12. The service board according to claim 7, wherein the CPU comprises:
a phase-locked loop;
a timer; and
a processor core;
wherein the phase-locked loop is configured to output a frequency division clock to the timer based on a reference pulse signal output by the crystal oscillator;
wherein the timer is configured to output a clock interrupt signal to the processor core based on the frequency division clock; and
wherein the processor core is configured to determine the CPU time based on the clock interrupt signal.

13. The service board according to claim 7, wherein synchronizing the clock board times is based on using a high-precision time synchronization protocol.

14. A network device, comprising:
a service board, wherein the service board comprises a central processing unit (CPU) and a clock board;
wherein the clock board is configured to synchronize clock board times between service boards; and
wherein the CPU is configured to:
after the clock board times are synchronized, obtain a CPU time and a clock board time of the service board according to a preset periodicity, wherein the CPU time is based on a clock signal generated by a crystal oscillator corresponding to the CPU of the service board, and the clock board time is based on a clock signal generated by the clock board of the service board;
record the obtained CPU time and the obtained clock board time;
for performing CPU time synchronization between the service boards, obtain a current CPU time of the service board, and calculate a synchronization time of the CPU based on the current CPU time, a last recorded CPU time, and a last recorded clock board time; and
adjust the CPU time of the service board to the synchronization time.

15. The network device according to claim 14, wherein calculating the synchronization time of the CPU comprises:
calculating the synchronization time by using an expression $C1=B1-B+A$, wherein $C1$ indicates the synchronization time, $B1$ indicates the current CPU time, $B$ indicates the last recorded CPU time, and $A$ indicates the last recorded clock board time.

16. The network device according to claim 14, wherein the CPU is further configured to:
obtain a bus access time, wherein the bus access time refers to a duration during which a bus is occupied while the clock board time is obtained; and
wherein calculating the synchronization time of the CPU comprises:
correcting the last recorded clock board time based on the bus access time; and
calculating the synchronization time of the CPU by using a corrected clock board time, the current CPU time, and the last recorded CPU time.

17. The network device according to claim 16, wherein correcting the last recorded clock board time comprises:
correcting the last recorded clock board time by using an expression $A1=A-\Delta A$, wherein $A1$ indicates the corrected clock board time, $A$ indicates the last recorded clock board time, and $\Delta A$ indicates the bus access time.

18. The network device according to claim 17, wherein calculating the synchronization time of the CPU comprises:
calculating the synchronization time by using an expression $C2=B1-B+A1$, wherein $C2$ indicates the synchronization time, $B1$ indicates the current CPU time, $B$ indicates the last recorded CPU time, and $A1$ indicates the corrected clock board time.

19. The network device according to claim 14, wherein the CPU comprises:
a phase-locked loop;
a timer; and
a processor core;
wherein the phase-locked loop is configured to output a frequency division clock to the timer based on a reference pulse signal output by the crystal oscillator;
wherein the timer is configured to output a clock interrupt signal to the processor core based on the frequency division clock; and
wherein the processor core is configured to determine the CPU time based on the clock interrupt signal.

20. The network device according to claim 14, wherein synchronizing the clock board times is based on using a high-precision time synchronization protocol.

\* \* \* \* \*